M. J. TODD.
TRACTION COUPLING.
APPLICATION FILED OCT. 19, 1907.
No. 910,329.
Patented Jan. 19, 1909.
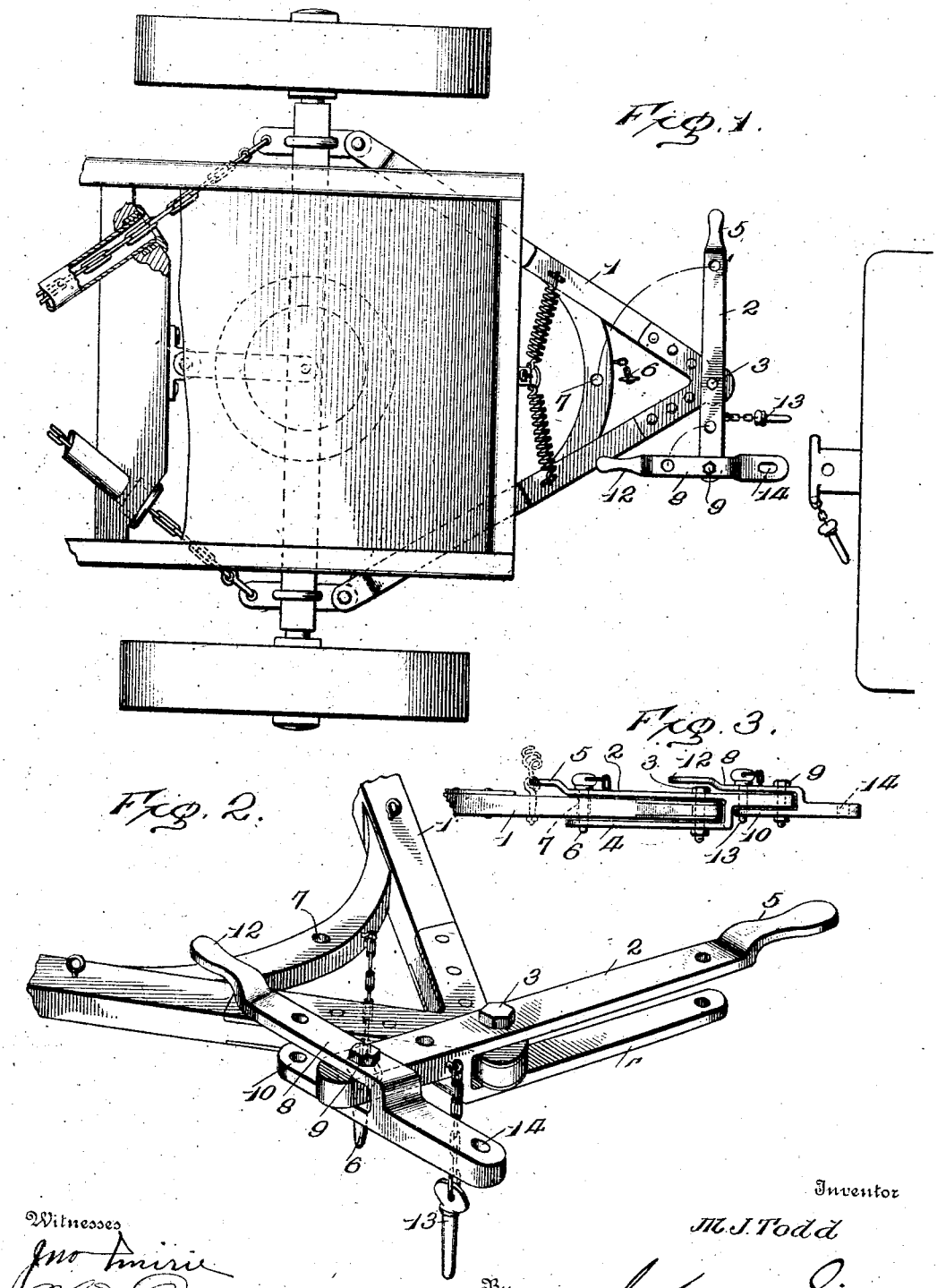

UNITED STATES PATENT OFFICE.

MARQUIS J. TODD, OF BUFFALO, NEW YORK, ASSIGNOR TO BUFFALO PITTS COMPANY, OF BUFFALO, NEW YORK, A CORPORATION OF NEW YORK.

TRACTION-COUPLING.

No. 910,329.  Specification of Letters Patent.  Patented Jan. 19, 1909.

Application filed October 19, 1907. Serial No. 398,288.

*To all whom it may concern:*

Be it known that I, MARQUIS J. TODD, of Buffalo, in the county of Erie and State of New York, have invented certain new and useful Improvements in Traction-Couplers; and I do hereby declare the following to be a full, clear, and exact description of the invention, such as will enable others skilled in the art to which it appertains to make and use the same.

Heretofore considerable difficulty has been experienced in connecting loaded cars or wagons to each other, as well as in coupling the end wagon of a train to the motor or traction engine by which the same is to be transported. If the respective draw-bars are out of line when it is desired to effect the coupling it has been usually necessary to employ a chain, or some other additional element, as a temporary connection, to enable the train to be started and pulled until the draw-bars could be brought into line, and thereupon one or more of the vehicles, as for instance the traction engine in reference to the first wagon, had to be backed to effect the direct coupling of the draw-bars. This is a cause of not only considerable annoyance, but involves considerable delay, as well as the necessity of carrying extra parts for temporary uses.

The primary object of my invention is to overcome these difficulties and to enable the coupling to be effected irrespective of whether or not the draw-bars of adjacent vehicles are in line with each other, without the necessity of employing any temporary connections; and a further object is to enable this to be done by means which will be simple in construction and capable of easy manipulation.

The invention will be hereinafter fully set forth and particularly pointed out in the claims.

In the accompanying drawings, Figure 1 is a plan view, showing a portion of a vehicle, and a portion of an engine platform, with my improved coupling mounted on the former. Fig. 2 is an enlarged view in perspective. Fig. 3 shows the parts in their locked position.

Referring to the drawings, 1 designates a fixed draw-bar extended horizontally from the carrying axle, one being provided at each end of the wagon or train of wagons.

2 designates a horizontally-disposed lever fulcrumed on the forward end of the fixed draw-bar by a bolt 3, such lever extending rearwardly over such draw-bar and provided with a depending spaced-apart bracing arm 4 which extends beneath the latter and through which the bolt 3 is also passed. This lever at its rear end is slightly raised to form a handle 5, and at a point near such handle has an opening to accommodate a pin 6 by which the lever may be locked to the fixed draw-bar, such pin also passing through an opening 7 in the latter.

8 designates a coupling member in the form of a second lever, fulcrumed by a bolt 9 on the outer end of lever 2, and, like the latter, provided with a depending spaced-apart bracing arm 10 which extends over the under side of the former arm of said lever 2. This lever 8 is likewise bent upwardly to form a manipulating handle 12 and has an opening to accommodate a pin 13 by which the coupling lever may be locked to lever 2. The outer end of the short arm of lever 8 is formed with a slot or opening 14 to accommodate a coupling pin. When pin 13 is withdrawn the coupling lever 8 may be turned on its fulcrum, either to the right or to the left, and by removing pin 6 a greater range of adjustability may be had by turning lever 2 in either direction thereby bodily swinging the coupling lever laterally and longitudinally.

The use and application of my invention will be best understood by reference to Fig. 1, wherein I have indicated diagrammatically the platform end of a traction engine, with the draw-bar thereof out of line with the draw-bar of the wagon to which it is to be coupled. As shown in said figure the locking pins 6 and 13 have been removed, permitting the two levers to be so turned as to position the coupling end of lever 8 in direct line with the draw-bar of the engine, so that the coupling may be readily and immediately effected. As soon as the engine has exerted a pull on the train or wagon, and thereby brought the two levers into alinement with each other and with the fixed draw-bars, such levers may be locked by the re-insertion of pins 6 and 13.

Thus it will be seen that immediate and direct coupling may be effected, without the employment of any separate or temporary means, or unnecessary shifting or backing of the engine, even though the draw-bars of the vehicles are not in line with each other.

I claim as my invention:—

1. A traction coupler comprising, in combination with a fixed draw-bar, a laterally-movable coupling member, and a laterally-movable member, the latter being pivotally connected to said fixed draw-bar, said coupling member being pivotally mounted on said laterally-movable member.

2. A traction coupler comprising, in combination with a fixed draw-bar, a horizontally-disposed lever fulcrumed on said draw-bar, a coupling member pivotally mounted on said lever, and locking pins for locking all three members in alinement.

3. A traction coupler comprising, in combination with a fixed draw-bar, a horizontally-disposed laterally-movable lever fulcrumed on said draw-bar, and a coupling member composed of a laterally-movable lever fulcrumed on the former lever, and means for locking said coupling-lever to the latter.

4. A traction coupler comprising, in combination with a fixed draw-bar, a horizontally-disposed lever fulcrumed on said draw-bar, means for locking said lever to said draw bar, a coupling member composed of a lever fulcrumed on the former lever, and means for locking said coupling lever to said former lever.

5. In combination, a fixed draw-bar having an opening, a horizontally-disposed lever fulcrumed on said fixed draw-bar, a pin for locking said lever to said draw-bar, a second lever fulcrumed on the former lever, and a pin for locking such second lever to said former lever, both levers being capable of being swung horizontally and of being locked in alinement with each other.

In testimony whereof, I have signed this specification in the presence of two subscribing witnesses.

MARQUIS J. TODD.

Witnesses:
FRANCIS S. MAGUIRE,
JOHN A. MURPHY.